(No Model.)
G. P. KENEHAN.
BELT FASTENER.
No. 507,622. Patented Oct. 31, 1893.
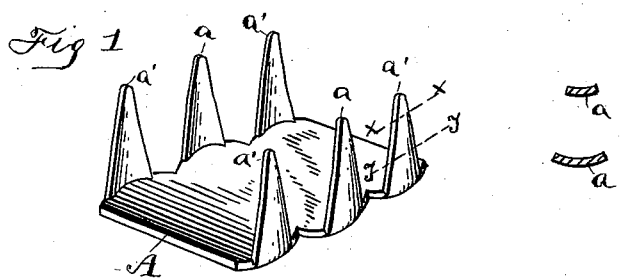
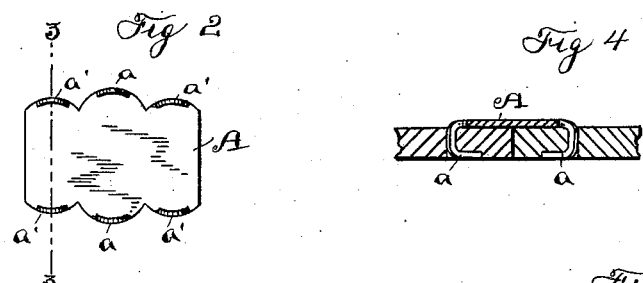
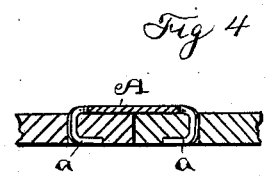
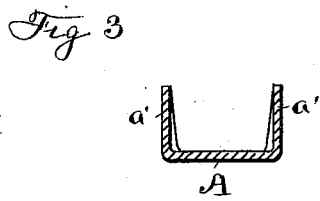
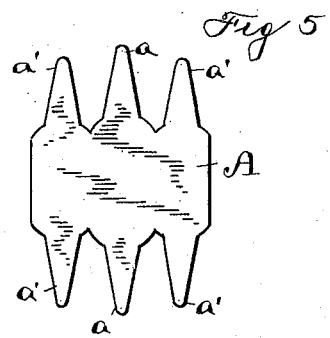
Witnesses
R. B. Tozer
Georgia Schaeffer
Inventor
Gilbert P. Kenehan
By H. J. Fisher
Attorney

UNITED STATES PATENT OFFICE.

GILBERT P. KENEHAN, OF CLEVELAND, OHIO.

BELT-FASTENER.

SPECIFICATION forming part of Letters Patent No. 507,622, dated October 31, 1893.

Application filed November 28, 1892. Serial No. 453,347. (No model.)

*To all whom it may concern:*

Be it known that I, GILBERT P. KENEHAN, a citizen of the United States, residing at Cleveland, in the county of Cuyahoga and State of Ohio, have invented certain new and useful Improvements in Belt-Fasteners; and I do hereby declare that the following is a full, clear, and exact description of the invention, which will enable others skilled in the art to which it appertains to make and use the same.

My invention has reference to metallic belt fasteners, and the invention consists in a belt fastener constructed and operating, substantially as herein shown and described and particularly pointed out in the claim.

In the accompanying drawings, Figure 1 is a perspective view of one of my improved belt fasteners in what may be termed an inverted position, and at its sides are cross sections of the teeth at different lines. Fig. 2 is a plan view of the said fastener. Fig. 3 is a cross section on line 3, 3, Fig. 2, representing the teeth as split through the center and showing the stock or material along the opposite side of the center tapering down practically to the point of the tooth. Fig. 4 is a cross section of a fastener as it appears when it has been secured in a belt with the teeth bent, and showing sections of the ends of the belt held by said fastener. Fig. 5 is a plan view of a blank from which the fastener is formed.

In carrying out my invention I employ suitable sheet steel or equivalent metal, and the first thing I do is to cut the blank, shown in Fig. 5, out of the steel by means of suitable dies. It will be noticed in this figure that the teeth $a$ at the middle of the sides of the fastener extend outward beyond the line of the end teeth $a'$, but all the teeth are bent to a uniform length from their points to their bases. Hence, it occurs that the teeth $a$ when bent up into shape, as seen in Fig. 1, are out of line with the teeth $a'$, and in this way the fastener is made to engage the belt at different points in cross section, as would not occur if the teeth were set in one line. There is, therefore, less tendency in the belt to break or weaken at any given point where the teeth enter than there would be otherwise.

When the blank has been made, as seen in Fig. 5, the next step in the production of the fastener is to form it into the shape shown in Fig. 1. This is done in other and differently formed dies than those originally used for cutting out the blank, and in which the upper die is formed at intervals with vertical ribs convex in cross section and with said convexity corresponding to the curvature in cross section to be given to the teeth. This curvature on the die has such depth as to impart a like formation to the full depth of the tooth. The opposite die is made concave in cross section and corresponds to the convexity of the inner die, so that when the tooth is produced between these dies, it is made concavo-convex from point to base. The concavo-convex conformation of the tooth apparently loses itself at the point, though it is present even there, and becomes more noticeable to the eye toward the base of the tooth because of the greater width of the tooth at that point. The degree of curvature may be seen in connection with Fig. 1, where cross sections of the tooth, taken on lines $x$, $x$, and $y$, $y$, of one of the teeth are shown.

It will be noticed that the body A of the fastener is whole throughout, and in this respect is much stronger than it would be if the teeth were struck up out of the body of the fastener. It will also be observed, as in Fig. 2, that the fastener has a scalloped edge, the base of each tooth being cut on a segment of a circle and the said segments running continuously along each edge. This peculiar and novel formation of the edge of the fastener contributes to the concavo-convex formation of the tooth in cross section, because the circle on which the scallop is struck is the same, exactly, as that to which the tooth is bent in cross section, and one curvature runs naturally into the other without strain to the material. It will also be seen that the middle scallop is deeper than those at the ends, which sets the middle tooth further out.

Several material advantages are obtained by this construction of fastener. In the first place the teeth are made much stronger than they would be if they were plain and straight in cross section, but more material still than this is the advantage of this peculiar construction in the matter of securing the ends of the belt firmly and closely together.

Having thus described my invention, what I claim is—

As an improved article of manufacture, the within described belt-fastener consisting of the solid or imperforated body A having its opposite edges scalloped, some of the scallops extending outwardly beyond the others, and tapering teeth projecting from the outer edges of the scallops at right angles to the body, concavo-convex in cross-section in conformity with the curvature of the scallops, and arranged staggering in conformity with the irregular extensions of the scallops, substantially as set forth.

Witness my hand to the foregoing specification, this 21st day of November, 1892.

GILBERT P. KENEHAN.

Witnesses:
  H. T. FISHER,
  GEORGIA SCHAEFFER.